(12) United States Patent
Cook et al.

(10) Patent No.: US 7,965,130 B1
(45) Date of Patent: Jun. 21, 2011

(54) LOW POWER CHARGE PUMP AND METHOD OF OPERATION

(75) Inventors: Thomas D. Cook, Austin, TX (US); Jeffrey C. Cunningham, Austin, TX (US); Karthik Ramanan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/633,584

(22) Filed: Dec. 8, 2009

(51) Int. Cl.
*G05F 1/10* (2006.01)
(52) U.S. Cl. .......................................... 327/536; 363/60
(58) Field of Classification Search .................. 327/536; 363/59–60
See application file for complete search history.

(56) References Cited

U.S. PATENT DOCUMENTS

| | | | |
|---|---|---|---|
| 4,451,743 A | | 5/1984 | Suzuki et al. |
| 5,959,854 A | * | 9/1999 | Okada ............................ 363/60 |
| 5,999,040 A | * | 12/1999 | Do et al. ....................... 327/536 |
| 6,091,613 A | | 7/2000 | Yang et al. |
| 6,169,673 B1 | | 1/2001 | McIntyre et al. |
| 6,249,445 B1 | * | 6/2001 | Sugasawa ....................... 363/60 |
| 6,429,723 B1 | | 8/2002 | Hastings |
| 6,504,422 B1 | | 1/2003 | Rader et al. |
| 6,784,723 B2 | * | 8/2004 | Lee et al. ....................... 327/536 |
| 6,831,500 B2 | * | 12/2004 | Sato et al. ..................... 327/536 |
| 6,834,001 B2 | | 12/2004 | Myono |
| 6,859,091 B1 | * | 2/2005 | Nicholson et al. ............ 327/536 |
| 6,934,187 B2 | | 8/2005 | Cheung |
| 7,009,857 B2 | | 3/2006 | Chen et al. |
| 7,173,478 B2 | * | 2/2007 | Chun ............................ 327/536 |
| 7,236,046 B2 | | 6/2007 | Georgescu et al. |
| 7,262,996 B2 | | 8/2007 | Cheung |
| 7,348,829 B2 | * | 3/2008 | Choy et al. .................... 327/536 |
| 7,468,898 B2 | | 12/2008 | Ogata et al. |
| 7,512,008 B2 | | 3/2009 | Chan et al. |
| 7,518,892 B2 | | 4/2009 | Kitagawa et al. |
| 7,558,129 B2 | | 7/2009 | Thorp et al. |
| 7,667,530 B2 | | 2/2010 | Chu et al. |
| 7,683,700 B2 | * | 3/2010 | Huynh et al. .................. 327/536 |
| 7,755,584 B2 | * | 7/2010 | Senda et al. .................... 345/87 |
| 2007/0052471 A1 | | 3/2007 | Ng |
| 2007/0252791 A1 | | 11/2007 | Oomori |
| 2007/0279950 A1 | | 12/2007 | Sugiyama et al. |
| 2008/0084239 A1 | | 4/2008 | Oswald et al. |

(Continued)

OTHER PUBLICATIONS

U.S. Appl. No. 12/619,303, filed Nov. 16, 2009.

(Continued)

*Primary Examiner* — Thomas J Hiltunen
(74) *Attorney, Agent, or Firm* — Charles Bergere; Robert L. King

(57) ABSTRACT

A charge pump and method for starting up a charge pump are provided. The charge pump comprises a plurality of charge pump cells and a start-up control circuit. Each charge pump cell has a clock terminal for receiving a delayed clock signal, an input terminal for receiving an input voltage, and an output terminal for providing a boosted voltage in response to receiving the clock signal and the input voltage. The start-up control circuit is coupled to the clock terminals of each of the plurality of charge pump cells. The start-up control circuit is for delaying the delayed clock signal provided to each charge pump cell of the plurality of charge pump cells. Each of the charge pump cells receives the delayed clock signal having a different predetermined delay so that each of the plurality of charge pump cells are enabled in a predetermined sequence during start-up of the charge pump.

17 Claims, 3 Drawing Sheets

U.S. PATENT DOCUMENTS

| | | |
|---|---|---|
| 2008/0191786 A1* | 8/2008 | Kwon et al. .................. 327/536 |
| 2009/0097285 A1 | 4/2009 | Cook et al. |
| 2009/0231022 A1* | 9/2009 | Kim et al. ..................... 327/536 |
| 2010/0013445 A1 | 1/2010 | Martinussen |
| 2010/0052771 A1* | 3/2010 | Hartono ........................ 327/536 |

OTHER PUBLICATIONS

U.S. Appl. No. 12/549,499, filed Aug. 28, 2009.
Notice of Allowance mailed Oct. 1, 2010 in U.S. Appl. No. 12/549,499.

* cited by examiner

LOW POWER CHARGE PUMP AND METHOD OF OPERATION

RELATED APPLICATION

This application is related to our copending U.S. patent application Ser. No. 12/619,303 entitled "Charge Pump For Use With A Synchronous Load" filed on Nov. 16, 2009 and assigned to the assignee hereof.

BACKGROUND

1. Field

This disclosure relates generally to semiconductors, and more specifically, to charge pump circuits.

2. Related Art

Lower power consumption continues to have importance in data electronic systems, due, for example, to widespread use of electronics that are powered by batteries or low voltage sources. Power conservation is not only particularly important for portable electronic devices, but is also important for applications such as automotive and medical electronics which are also powered from a battery.

Charge pump circuits are typically used to increase voltage levels in applications where the power supply voltage is not high enough for a particular need. There are many varying forms of charge pump circuits. Generally, known charge pump circuits consume a significant amount of power, particularly during the start-up portion of operation. Charge pump circuits transfer charge to a capacitor and then boost the stored voltage by coupling an input voltage to the capacitor to increase the stored voltage by an amount equal to the input voltage. This leads to large transients seen by the power supplies which are not optimal to a low power system. Some known charge pump circuits try to change the ramp rate of the boosted output voltage to avoid problems in the load circuits such as high current surges which may damage circuitry. However, such circuits do not change the power consumption. In some applications, a pull-down transistor is used to control a voltage ramp rate. In such applications, the pull-down transistor increases the amount of energy that is required for the charge pump. Other known charge pumps control a voltage ramp-up rate by changing the charge pump clock frequency. However, by changing the clock frequency, the performance of the circuit can be degraded and the output impedance of the charge pump increased. Such circuits generally have large power consumption.

Another problem associated with some charge pumps occurs when the boosted voltage increases at a high ramp rate and stresses the output capability of a high output impedance power supply. These circuit conditions impose a very high demand on a system power supply source as the high impedance and sudden increase in voltage results in the system power supply sourcing a very large amount of current. As a result, a brown-out condition may result within the system so that the power supply is not able to adequately power other system circuitry.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
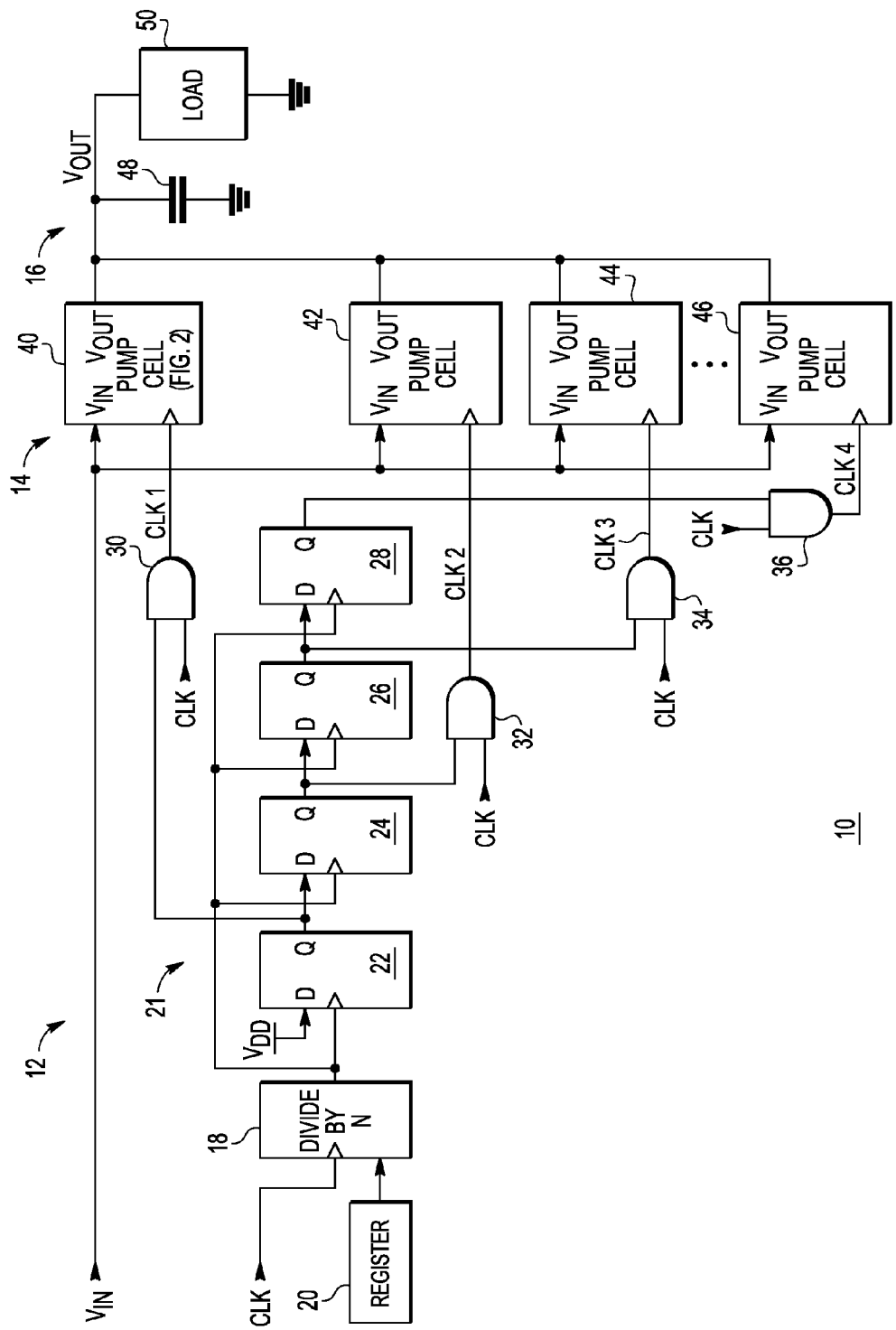
FIG. 1 illustrates in schematic diagram form a charge pump circuit in accordance with one form of the present invention.

In one embodiment FIG. 1 illustrates a charge pump 10 for boosting an input voltage, $V_{IN}$, to a boosted output voltage in a very power efficient method. Generally, the charge pump 10 has a start-up control circuit 12, a plurality of pump cells 14 and an output section 16. Within the start-up control circuit 12 is a divider 18 (i.e. a divide-by circuit) and a shift register 21. A clock signal labeled CLK is connected to a clock input of divider 18. In one form the divider 18 functions to divide the clock signal by a factor of N, where N is an integer. A register 20 has an output coupled to a control input of divider 18. An output of divider 18 is connected to clock inputs of each of a flip-flop 22, a flip-flop 24, a flip-flop 26 and a flip-flop 28. A data input, D, of flip-flop 22 is connected to a power supply terminal for receiving a power supply voltage $V_{DD}$. A data output of flip-flop 22 labeled Q is connected to a data input of flip-flop 24 and to a first input of an AND gate 30. A second input of AND gate 30 is connected to the clock signal. An output of AND gate 30 provides a signal labeled Clk 1 and is connected to a clock input of a charge pump cell 40. A data output of flip-flop 24 is connected to a data input of flip-flop 26 and to a first input of an AND gate 32. A second input of AND gate 32 is connected to the clock signal. An output of AND gate 32 provides a signal labeled Clk 2 and is connected to a clock input of a charge pump cell 42. A data output of flip-flop 26 is connected to a data input of flip-flop 28 and to a first input of an AND gate 34. A second input of AND gate 34 is connected to the clock signal. An output of AND gate 34 provides a signal labeled Clk 3 and is connected to a clock input of a charge pump cell 44. A data output of flip-flop 28 is connected to a first input of an AND gate 36. A second input of AND gate 36 is connected to the clock signal. An output of AND gate 36 provides a signal labeled Clk 4 and is connected to a clock input of charge pump cell 46. Each of charge pump cells 40, 42, 44 and 46 has a data input for receiving the input voltage, Vin. Circuit details of an exemplary form of the charge pump cells will be illustrated in FIG. 2 for the charge pump cell 40. Any number of charge pump cells 14 may be implemented as noted by the dots separating charge pump cell 44 from charge pump cell 46. An output of the charge pump cells 40, 42, 44 and 46 is connected to a first electrode of a smoothing capacitor 48 and to a first terminal of an output load 50. A second electrode of smoothing capacitor 48 is connected to ground, and a second terminal of output load 50 is connected to ground.

In operation, the register 20 is a programmable memory which permits user programming of the factor N which is the divisor of divider 18. The start-up control circuit 12 functions to control a rate of increase of the boosted voltage Vout when the charge pump 10 is first initialized. In one form the start-up control circuit 12 is implemented as a clocked shift register that is clocked by the Clk signal. The regulation provided by the start-up control circuit 12 functions to sequentially enable the charge pump cells 40, 42, 44 and 46 rather than to enable all charge pump cells to turn on at the same time. In the illustrated form, the divider 18 does not generate a clock pulse to each of the flip flops 22, 24, 26 and 28 until passage of N clock signals. In one form the divider detects only rising edge transitions and thus N clock cycles must occur before the first generation of a clock signal to the flip flop 22, 24, 26 and 28 occurs. Because the flip flop 22 has its data input connected to the $V_{DD}$ power supply, the output of flip flop 22 transitions to a logic one when flip flop 22 is initially clocked. The other flip flops 24, 26 and 28 do not initially output a logic one. Upon the transition of the Q output of flip flop 22, the output of AND gate 30 will clock the charge pump cell 40 at the next positive CLK edge transition. When charge pump cell 40 is clocked, the charge pump cell 40 couples a boosted version of the input voltage to the output load 50 as output voltage Vout. Upon the second passage of N clocks, the divider 18 will again clock each of flip flops 22, 24, 26 and 28. In response to the second passage of N clocks, the Q output of both flip flops 22 and 24 will be a logic one in order to condition each of AND gates 30 and 32 to provide a logic one output upon the next logic one value of the CLK signal. Therefore, upon the passage of two groups of N clocks, both the charge pump cells 40 and 42 will be clocked and provide an output voltage to the output load 50. Thus the Vout voltage is boosted from the first passage of N clocks to the second passage of N clocks. Neither of charge pump cell 44 or charge pump cell 46 is yet contributing to the output voltage Vout.

Upon the passage of a third group of N clocks, the divider 18 will again clock each of flip flops 22, 24, 26 and 28. In response to the third passage of N clocks, the Q output of flip flops 22, 24 and 26 will be a logic one to condition each of AND gates 30, 32 and 34 to provide a logic one output upon the next logic one value of the CLK signal. Therefore, upon the passage of three groups of N clocks, the charge pump cells 40, 42 and 44 will be clocked and provide an output voltage to the output load 50. Thus the Vout voltage is again boosted from the previous boosted value. The charge pump cell 46 is not yet contributing to the output voltage Vout.

Assuming only four charge pump cells are implemented, upon the passage of four groups of N clocks, the divider 18 will again clock each of flip flops 22, 24, 26 and 28. In response to the passage of four groups of N clocks, the Q output of flip flops 22, 24, 26 and 28 will be a logic one to condition each of AND gates 30, 32, 34 and 36 to provide a logic one output upon the next logic one value of the CLK signal. Therefore, upon the fourth passage of N clocks, the charge pump cells 40, 42, 44 and 46 will be clocked and provide an output voltage to the output load 50. Thus the Vout voltage is again boosted from the passage of the third group of N clocks to the passage of the fourth group of N clocks. At this point, all charge pump cells are contributing to the output voltage Vout.

The function of smoothing capacitor 48 that is connected in parallel with load 50 is to stabilize the output voltage to a desired value during start-up or transient events. For example, if the load 50 consumes a large amount of current, smoothing capacitor 48 functions to stabilize the output current by smoothing or limiting the current surge at the output. The smoothing capacitor 48 also prevents the output voltage from continuously varying in small amounts as the pump cells 40, 42, 44 and 46 sequentially increase the output voltage.

At some point in time the charge pump is turned off and the output voltage is reduced to zero volts. In this state, the shift register 21 is reset via applying a reset signal to reset inputs (not shown) in a conventional manner.

Figure 2:
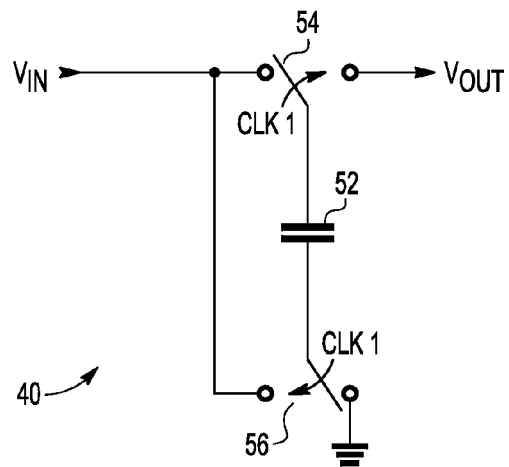
FIG. 2 illustrates in schematic diagram form an exemplary form of a pump cell in accordance with one form of the present invention.

Illustrated in FIG. 2 is an exemplary charge pump cell that may be used within charge pump 10 of FIG. 1. A charge pump cell 40 has a switch 54 having a terminal connected to a first electrode of a capacitor 52. A second electrode of switch 54 is switched between a terminal for receiving the input voltage $V_{IN}$ and a terminal for providing the output voltage $V_{OUT}$. A second electrode of the capacitor 52 is connected to a first terminal of a switch 56. A second terminal of switch 56 is connected between ground and the input voltage $V_{IN}$. Switch 54 and switch 56 are clocked by the clock signal labeled Clk 1 which is the output of AND gate 30.

In operation, assume initially that the Clk 1 signal has switched switch 54 to the input voltage $V_{IN}$ and switch 56 to the ground terminal. In this phase of the Clk 1 signal, the capacitor 52 charges to the input voltage $V_{IN}$. In the next phase of the Clk 1 signal, the states of switch 54 and switch 56 reverse. The first terminal of switch 54 is connected to the terminal for providing $V_{OUT}$ and the second terminal of switch 56 is connected to the input voltage $V_{IN}$. As a result of this circuit configuration, the previously charged $V_{IN}$ on capacitor 52 is connected to the output voltage terminal and boosted by the value of $V_{IN}$ through charge transfer. As a result, a voltage doubler is created and a total output voltage of $2(V_{IN})$ (assuming no losses) is provided at the output terminal. In another form the second terminal of switch 56 may be connected to a voltage other than $V_{IN}$, such as a boost voltage. When a boost voltage other than $V_{IN}$ is used, the output voltage will transition to a value of $V_{IN}$ plus the boost voltage.

Figure 3:
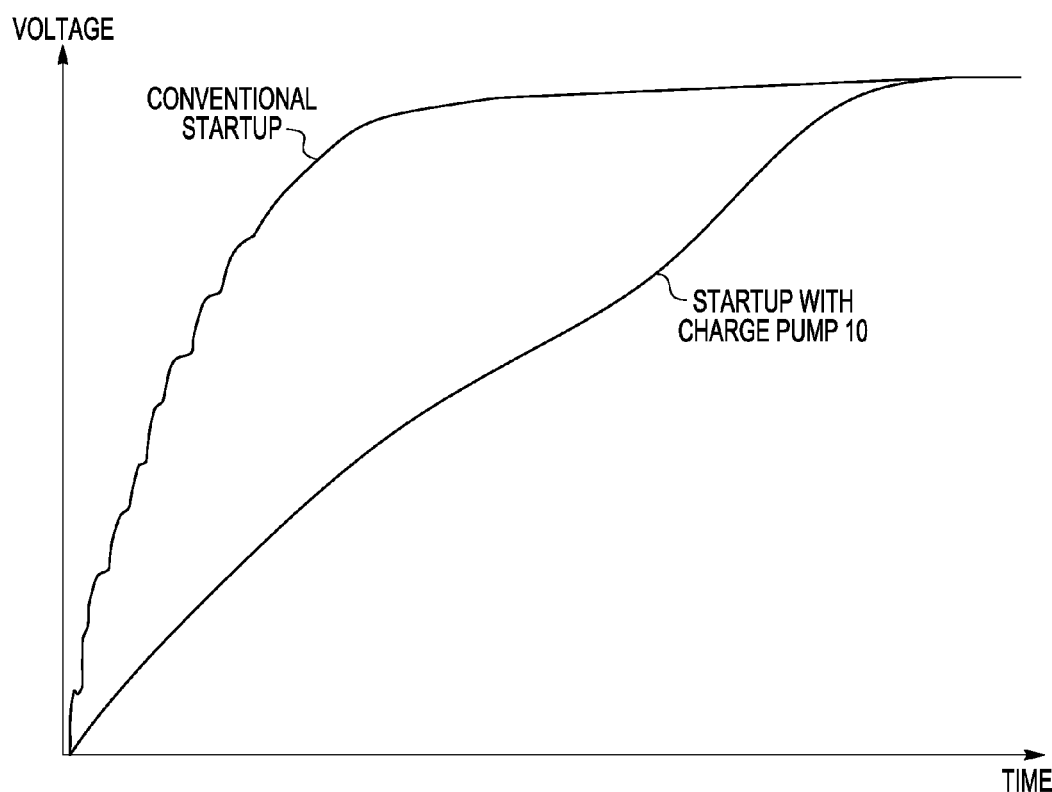
FIG. 3 illustrates in graphical form voltage curves for a conventional charge pump and a charge pump as described herein.

Illustrated in FIG. 3 is a graphical illustration that illustrates the boosted output voltage over a period of time. In particular, the output voltage associated with a conventional charge pump and with charge pump 10 is illustrated. The output voltage associated with a conventional charge pump quickly increases as a function of time. Initial power consumption is very large as the maximum boosted voltage is quickly reached. In contrast, the output voltage of charge pump 10 of FIG. 1 at startup reduces peak power of the charge pump 10. By clocking the flip-flops of the shift register 21, the switching of the capacitors in each of the charge pump cells 40, 42, 44 and 46 is delayed such that the peak power consumption is significantly lower. Rather than quickly reaching the maximum boost voltage, the power is averaged over a longer period of time.

Figure 4:
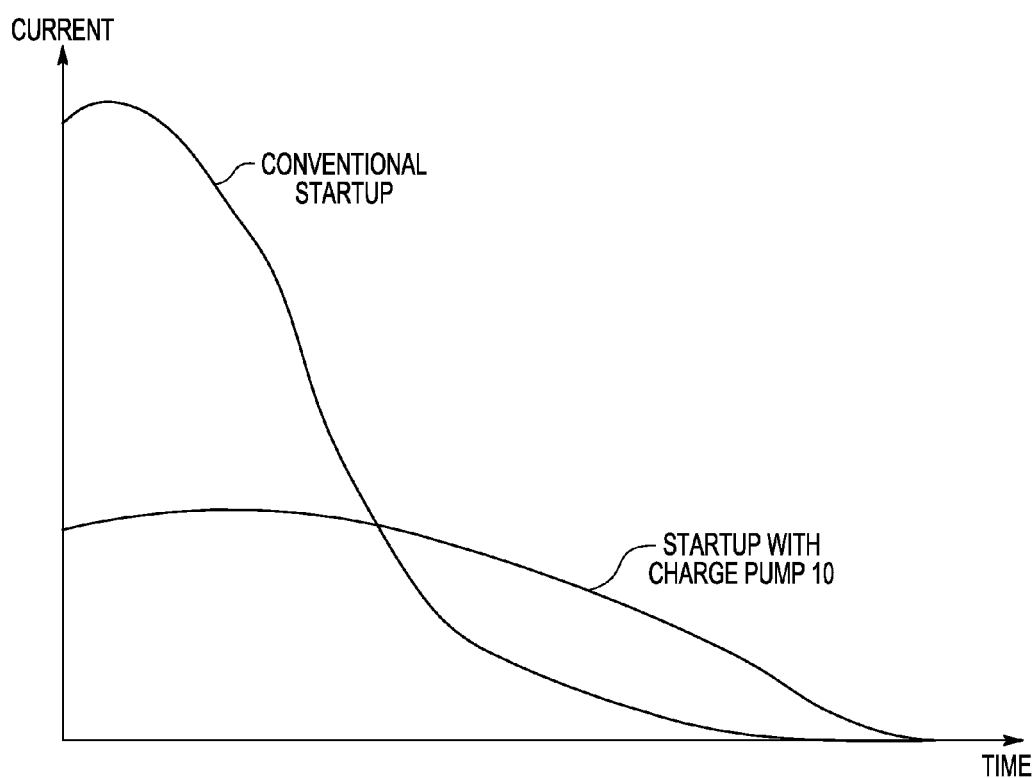
FIG. 4 illustrates in graphical form current curves for a conventional charge pump and a charge pump as described herein.

Illustrated in FIG. 4 is a graphical illustration of the output current of charge pumps over a period of time. In particular, the output current associated with a conventional charge pump and with charge pump 10 is illustrated. The output current associated with a conventional charge pump initially spikes in order to raise the output voltage above the input voltage. The largest amount of current is consumed during the first clock cycle and the shape of the average current curve during succeeding clock cycles exponentially decreases with a time constant determined by the relative values of the charging and output capacitors. This initial high current spike is very problematic for systems using a power supply having a low supply voltage value and a high output impedance power supply.

In contrast, the output current of the charge pump 10 is much lower at startup and therefore initial power consumption is significantly reduced. By clocking the flip-flops of the shift register 21, the switching of the capacitors in each of the charge pump cells 40, 42, 44 and 46 is delayed such that the peak power consumption is lower. The amount of current at start-up consumed by charge pump 10 is a function of how many charge pump cells are clocked. During the startup time the average current remains relatively constant and spreads the average power over the entire start-up time. Rather than a spiking current, the total power consumed is the same, but the peak current is lower.

By now it should be appreciated that there has been provided a method and circuitry for a charge pump having low power consumption during a start-up of supplying a boosted voltage. By selectively enabling a plurality of charge pump cells over a period of time, power consumption at start-up is reduced by starting with a smaller charging capacitance and additional capacitance is added on succeeding clock cycles. During the start-up period of the charge pump each of a plurality of pump cells is successively enabled by shifting a logic one value through shift register 21. The clock division performed by divider 18 determines the rate at which the pump cells are enabled. Generally the rate is selected to equalize the power load on the input while minimizing the startup time. In one form the charging capacity of each pump cell is the same in order to equalize the power load. Initially only a first pump cell is enable so the current consumption of the output load 50 is a fraction of the current that would be required if all of the pump cells were enabled. A second pump cell is enabled and timed to be enabled so that the power consumption of the first pump cell has become low enough so that the power consumption of the combination of the first and second pump cells is approximately equal to the initial power consumption of the first pump cell alone. The remaining pump cells are enabled in a timed fashion so that the power consumption of the output load 50 remains relatively constant and significantly lower than if all the pump cells were enabled simultaneously. In order to achieve relatively constant power consumption, the pump cells may contain a differing number of switched capacitors. In one form the number of capacitive elements in pump cells 40, 42, 44 and 46 is binarily weighted (e.g. pump cell 40 has one capacitor, pump cell 42 has two capacitors, pump cell 44 has four capacitors, etc.). Other ratio schemes may also be used. It should be appreciated that the charge pump 10 is one component in any of numerous system applications. As such, the method described herein is applicable for use with various regulation schemes used in combination with the charge pump described herein.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention. It should be understood that all circuitry described herein may be implemented either in silicon or another semiconductor material. During a manufacturing process of the described charge pump, the illustrated circuitry may be instantiated by a software code representation of silicon or another semiconductor material.

In one form there is herein provided a charge pump having a plurality of charge pump cells, each charge pump cell of the plurality of charge pump cells having a clock terminal for receiving a delayed clock signal, an input terminal for receiving an input voltage, and an output terminal for providing a boosted voltage in response to receiving the delayed clock signal and the input voltage. A start-up control circuit is coupled to the clock terminals of each of the plurality of charge pump cells. The start-up control circuit delays the delayed clock signal provided to each charge pump cell of the plurality of charge pump cells. Each of the charge pump cells receives the delayed clock signal having a different predetermined delay so that each of the plurality of charge pump cells are enabled in a predetermined sequence during start-up of the charge pump. In another form the output terminals of each of the plurality of charge pump cells are all coupled to each other. In another form the start-up control circuit has a shift register having a plurality of output terminals. An output terminal of the plurality of output terminals is coupled to the clock terminal of one of the plurality of charge pump cells. A divider has an input coupled to receive a clock signal, and an output coupled to the shift register. In another form the start-up control circuit further has a register for setting a divisor value of the divider. In yet another form the start-up control circuit further has a logic circuit coupled to each of the plurality of output terminals of the shift register. The logic circuit logically combines an output from the shift register with the clock signal to generate the delayed clock signal. In yet another form each charge pump cell of the plurality of charge pump cells has a capacitor having a first plate electrode and a second plate electrode, a first switch for switching the first plate electrode of the capacitor between the input terminal and the output terminal in response to the delayed clock signal, and a second switch for switching the second plate electrode of the capacitor between the input terminal and a ground terminal in response to the delayed clock signal. In another form each charge pump cell of the plurality of charge pump cells is a capacitor. In yet another form the start-up control circuit delays the delayed clock signal provided to each charge pump cell by masking the clock signal by the different predetermined delays to provide the delayed clock signal.

In yet another form there is provided a charge pump having a plurality of charge pump cells. Each charge pump cell of the plurality of charge pump cells having a clock terminal for receiving a delayed clock signal, an input terminal for receiving an input voltage, and an output terminal for providing a boosted voltage in response to receiving the delayed clock signal and the input voltage, wherein the output terminals of the plurality of charge pump cells are coupled together. A start-up control circuit is coupled to the clock terminals of each of the plurality of charge pump cells. The start-up control circuit delays the delayed clock signal provided to each charge pump cell of the plurality of charge pump cells. Each of the charge pump cells receives the delayed clock signal having a different predetermined delay so that each of the plurality of charge pump cells is enabled in a predetermined sequence during start-up of the charge pump. In another form the plurality of charge pump cells are coupled together in parallel. In yet another form the start-up control circuit has a shift register having a plurality of output terminals. An output terminal of the plurality of output terminals is coupled to the clock terminal of one of the plurality of charge pump cells. A divider has an input coupled to receive the clock signal, and an output coupled to the shift register. In another form the start-up control circuit further includes a register for setting a divisor value of the divider. In yet another form each charge pump cell of the plurality of charge pump cells is a capacitor.

In another form there is provided a method for starting a charge pump. The charge pump has a plurality of charge pump cells, each of the plurality of charge pump cells for boosting an input voltage to provide an output voltage. A clock signal is provided to a start-up control circuit. The start-up control circuit is used to sequentially enable each of the plurality of charge pump cells until all of the plurality of charge pump cells are enabled to provide the output voltage. In another form the sequentially enabling the plurality of charge pump cells includes enabling the plurality of charge pump cells one-by-one. In another form the providing the clock signal to a start-up control circuit further includes masking the clock signal by a plurality of different predetermined delays. In yet another form sequentially enabling each of the plurality of charge pump cells further includes sequentially enabling each of the plurality of charge pump cells in a sequence determined by the plurality of different predetermined delays. In another form the sequentially enabling further includes sequentially enabling each of the plurality of charge pump cells to reduce peak transient current at an input terminal for receiving the input voltage. In yet another form the sequentially enabling each charge pump cell further includes dividing the clock signal to provide a delayed clock signal and shifting, with a shift register, the delayed clock signal to provide a plurality of delayed clock signals having different delay times. The plurality of delayed clock signals is provided to the plurality of charge pump cells. In yet another form dividing the clock signal further includes providing a user selectable divisor value.

Some of the above embodiments, as applicable, may be implemented using a variety of different information processing systems. For example, various semiconductor capacitor structures may be used to implement the described circuitry. The charge pump 10 is implemented independent of the type of semiconductor manufacturing process. The current source and voltage source which provides a reference voltage may be implemented with various circuit implementations known to provide these functions. Circuit details of divider 18 and the logic gates is not provided as differing known divider circuits and logic circuitry may be implemented to perform the described function. Similarly, various types of storage devices may be used to implement register 20. Various types of shift registers may be used to implement shift register 21. The shift register 21 is functioning to selectively block or mask the clock signal from reaching each pump cell until a predetermined point in time. Circuitry other than a shift register may be used to implement the start-up control circuit 12. For example a counter and logic circuitry may replace divider 18 and shift register 21 to sequentially enable each of the pump cells in response to AND gates 30, 32, 34 and 36 by masking or blocking the clock signal by different predetermined delays to provide the delayed clock signal to each pump cell.

Although the invention is described herein with reference to specific embodiments, various modifications and changes can be made without departing from the scope of the present invention as set forth in the claims below. Thus, it is to be understood that the circuitry depicted herein is merely exemplary, and that in fact other circuit elements can be implemented which achieve the described functionality. Any arrangement of components to achieve the same functionality is effectively "associated" such that the desired functionality is achieved. Hence, any two components herein combined to achieve a particular functionality can be seen as "associated with" each other such that the desired functionality is achieved. Likewise, any two components so associated can also be viewed as being "operably connected," or "operably coupled," to each other to achieve the desired functionality.

The term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A charge pump, comprising:
   a plurality of charge pump cells, each charge pump cell of the plurality of charge pump cells having a clock terminal for receiving a delayed clock signal, an input terminal for receiving an input voltage, and an output terminal for providing a boosted voltage in response to receiving the delayed clock signal and the input voltage; and
   a start-up control circuit, coupled to clock terminals of each of the plurality of charge pump cells, the start-up control circuit for delaying the delayed clock signal provided to each charge pump cell of the plurality of charge pump cells, wherein each of the charge pump cells receives the delayed clock signal having a different predetermined delay so that each of the plurality of charge pump cells are enabled in a predetermined sequence during start-up of the charge pump, and wherein the start-up control circuit includes,
   a shift register having a plurality of output terminals, an output terminal of the plurality of output terminals coupled to the clock terminal of one of the plurality of charge pump cells; and
   a divider having an input coupled to receive a clock signal, and an output coupled to the shift register.

2. The charge pump of claim 1, wherein the output terminal of each of the plurality of charge pump cells are all coupled to each other.

3. The charge pump of claim 1, wherein the start-up control circuit further comprises a register for setting a divisor value of the divider.

4. The charge pump of claim 1, wherein the start-up control circuit further comprises a logic circuit coupled to each of the plurality of output terminals of the shift register, the logic circuit for logically combining an output from the shift register with the clock signal to generate the delayed clock signal.

5. The charge pump of claim 1, wherein each charge pump cell of the plurality of charge pump cells comprises:
   a capacitor having a first plate electrode and a second plate electrode;
   a first switch for switching the first plate electrode of the capacitor between the input terminal and the output terminal in response to the delayed clock signal; and
   a second switch for switching the second plate electrode of the capacitor between the input terminal and a ground terminal in response to the delayed clock signal.

6. The charge pump of claim 1, wherein each charge pump cell of the plurality of charge pump cells comprises a capacitor.

7. The charge pump of claim 1, wherein the start-up control circuit delays the delayed clock signal provided to each charge pump cell by masking a clock signal by the different predetermined delays to provide the delayed clock signal.

8. A charge pump, comprising:
   a plurality of charge pump cells, each charge pump cell of the plurality of charge pump cells having a clock terminal for receiving a delayed clock signal, an input terminal for receiving an input voltage, and an output terminal for providing a boosted voltage in response to receiving the delayed clock signal and the input voltage, wherein the output terminals of the plurality of charge pump cells are coupled together; and a start-up control circuit, coupled to the clock terminals of each of the plurality of charge pump cells, the start-up control circuit for delaying the delayed clock signal provided to each charge pump cell of the plurality of charge pump cells, wherein each of the charge pump cells receives the delayed clock signal having a different predetermined delay so that each of the plurality of charge pump cells are enabled in a predetermined sequence during start-up of the charge pump, and wherein the start-up control circuit comprises:

a shift register having a plurality of output terminals, an output terminal of the plurality of output terminals coupled to the clock terminal of one of the plurality of charge pump cells; and a divider having an input coupled to receive a clock signal, and an output coupled to the shift register.

9. The charge pump of claim 8, wherein the plurality of charge pump cells are coupled together in parallel.

10. The charge pump of claim 8, wherein the start-up control circuit further comprises a register for setting a divisor value of the divider.

11. The charge pump of claim 8, wherein each charge pump cell of the plurality of charge pump cells comprises a capacitor.

12. A method for starting a charge pump, the charge pump having a plurality of charge pump cells, each of the plurality of charge pump cells for boosting an input voltage to provide an output voltage, the method comprising:

providing a clock signal to a start-up control circuit; and using the start-up control circuit, sequentially enabling each of the plurality of charge pump cells until all of the plurality of charge pump cells are enabled to provide the output voltage, wherein sequentially enabling each charge pump cell further comprises:

dividing the clock signal to provide a delayed clock signal;

shifting, with a shift register, the delayed clock signal to provide a plurality of delayed clock signals having different delay times; and providing the plurality of delayed clock signals to the plurality of charge pump cells.

13. The method of claim 12, wherein sequentially enabling the plurality of charge pump cells comprises enabling the plurality of charge pump cells one-by-one.

14. The method of claim 12, wherein providing the clock signal to a start-up control circuit further comprises masking the clock signal by a plurality of different predetermined delays.

15. The method of claim 14, wherein sequentially enabling each of the plurality of charge pump cells further comprises sequentially enabling each of the plurality of charge pump cells in a sequence determined by the plurality of different predetermined delays.

16. The method of claim 14, wherein sequentially enabling further comprises sequentially enabling each of the plurality of charge pump cells to reduce peak transient current at an input terminal for receiving the input voltage.

17. The method of claim 12, wherein dividing the clock signal further comprises providing a user selectable divisor value.

* * * * *